O. A. LIGHT.
REAR AXLE FOR AUTOMOBILES AND MEANS FOR SUPPORTING THE FRAME OR BODY IN RELATION THERETO.
APPLICATION FILED NOV. 23, 1914.

1,183,387.

Patented May 16, 1916.
2 SHEETS—SHEET 1.

WITNESSES:

INVENTOR.
OLIVER A. LIGHT
BY
ATTORNEY.

O. A. LIGHT.
REAR AXLE FOR AUTOMOBILES AND MEANS FOR SUPPORTING THE FRAME OR BODY IN RELATION THERETO.
APPLICATION FILED NOV. 23, 1914.

1,183,387.

Patented May 16, 1916.
2 SHEETS—SHEET 2.

WITNESSES:

INVENTOR.
OLIVER A. LIGHT
BY
ATTORNEY.

UNITED STATES PATENT OFFICE.

OLIVER A. LIGHT, OF CHICAGO, ILLINOIS, ASSIGNOR OF ONE-HALF TO EMMA E. BONNEAU, OF DETROIT, MICHIGAN.

REAR AXLE FOR AUTOMOBILES AND MEANS FOR SUPPORTING THE FRAME OR BODY IN RELATION THERETO.

1,183,387.  Specification of Letters Patent.  Patented May 16, 1916.

Application filed November 23, 1914. Serial No. 873,441.

*To all whom it may concern:*

Be it known that I, OLIVER A. LIGHT, a citizen of the United States, residing at Chicago, county of Cook, State of Illinois, have invented a certain new and useful Improvement in Rear Axles for Automobiles and Means for Supporting the Frame or Body in Relation Thereto, and declare the following to be a full, clear, and exact description of the same, such as will enable others skilled in the art to which it pertains to make and use the same, reference being had to the accompanying drawings, which form a part of this specification.

This invention relates to rear axles for automobiles and means for supporting the frame or body in relation thereto.

Its object is an axle of inexpensive construction in which the wheels may be individually driven by a jack-shaft connected with the source of power in any approved manner. The axle is supported upon opposite sides of the frame or body by the radius rods pivoted on the jack-shaft, and a further object of the invention is an axle of two parts yieldably held in axial alinement and capable of relative longitudinal movement whereby the axle may lengthen whenever either of the wheels is raised from the road surface.

Another object of the invention is an axle having a ball-joint connection with the radius rods whereby a change of the angle of the axle relative to the horizontal does not produce a twisting strain on the radius rods.

These and further objects and the novel features of construction whereby they may be attained are hereinafter more fully described and claimed and shown in the accompanying drawings in which—

Figure 1:
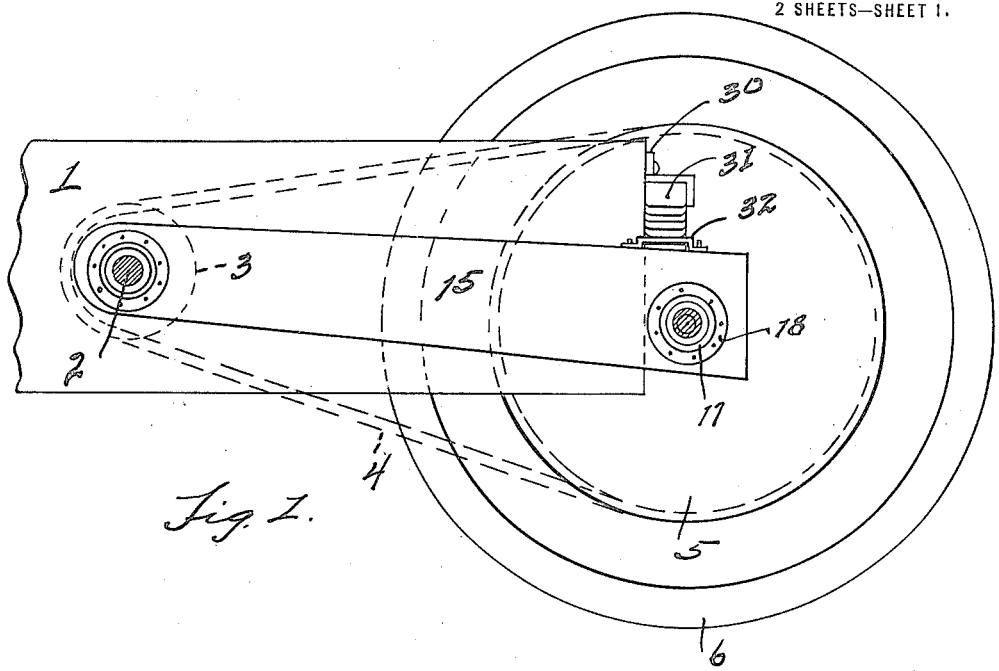
Figure 2:
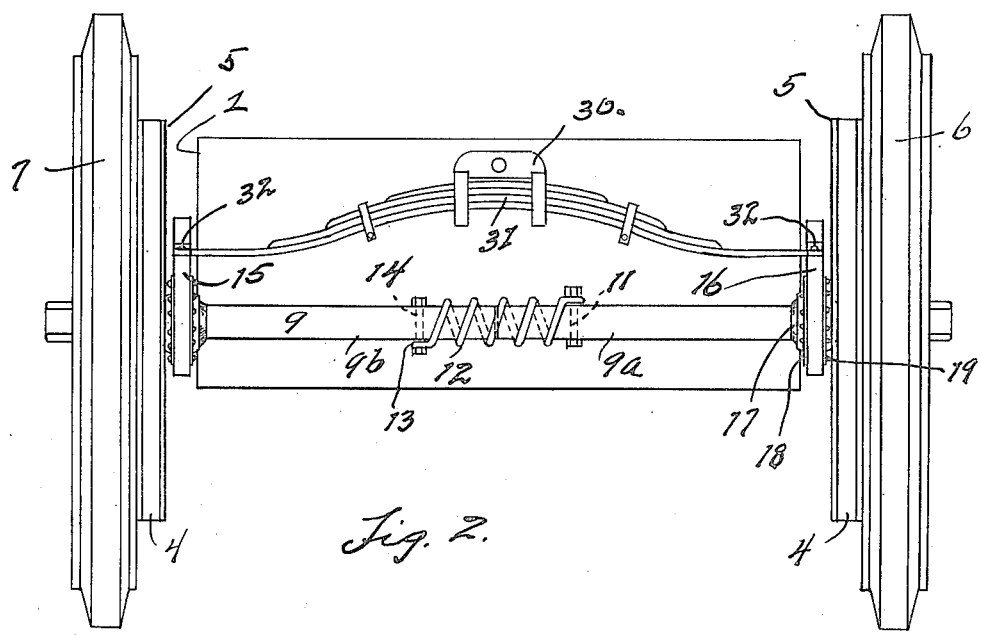
Figure 3:
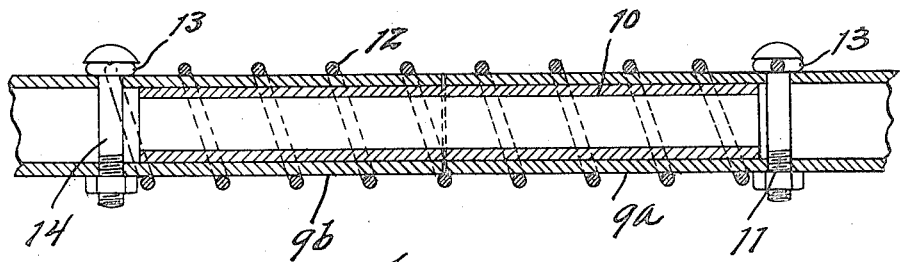
Figure 4:
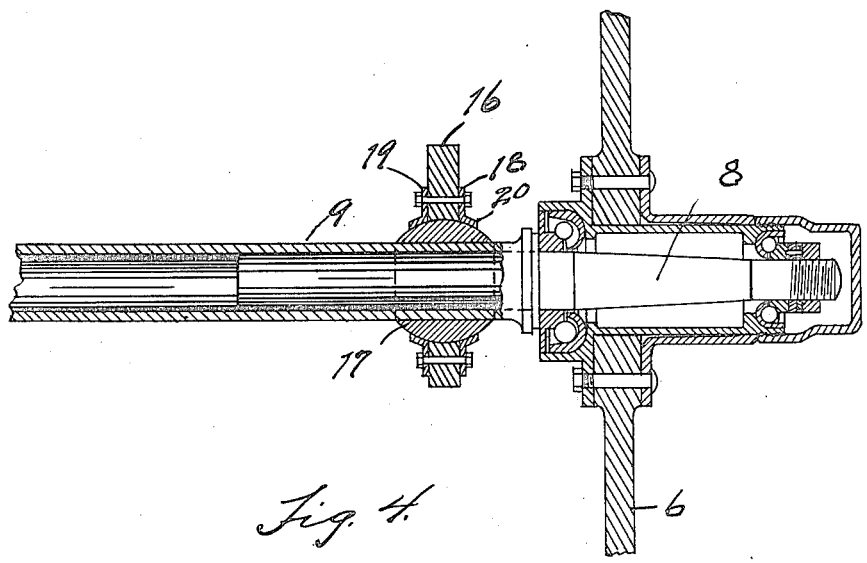

Figure 1 is a side view partly in section of the rear end of an automobile embodying my invention showing the radius rod and the spring suspension of the frame or body thereon. Fig. 2 is a rear view thereof showing the two part axle and means for suspending the frame or body thereon. Fig. 3 is an enlarged vertical section of the adjacent inner ends of the two axle members showing the spring for yieldingly holding the parts from longitudinal movement. Fig. 4 is an enlarged detail showing the ball-joint connection between the radius rod and the axle.

Similar characters refer to similar parts throughout the drawing and specification.

1 indicates a side of the body or frame. Supported in or by these frames is a jack-shaft 2 connected with the source of power in any well known manner now in use. On opposite ends of this shaft 2 are pulleys 3, each having a belt 4 running over corresponding pulleys 5 on each drive-wheel 6 and 7 as may be seen more particularly in Fig. 2. While belts and pulleys are here shown it is to be understood that sprockets and chains may be utilized if so desired. As may be understood from Fig. 4, the rear wheels 6 and 7 are mounted to rotate on spindles 8 at each end of the axle, and the axle 9, therefore, need not rotate with the wheels. The axle is formed of two similar tubular parts $9^a$ and $9^b$, and a tubular member 10 is inserted in the ends thereof between the bolts 11 and 14 which extend through the parts $9^a$ and $9^b$ as shown in Fig. 3. A coil spring 12 is situated about the exterior of the contiguous ends of the two parts of the axle and each end of the spring is provided with an eye 13 through which the bolts 11 and 14 extend respectively. When assembled, the spring 12 is placed under tension and tends to draw the two ends of the parts $9^a$ and $9^b$ together and allowing the said parts to separate under sufficient strain.

The radius rods 15 and 16 are preferably of the form of flat bars pivoted by means of a ball-joint at the forward ends on the jack-shaft 2. The bars extend beyond the frame or body 1 at the rear end and are apertured to receive the respective axle members $9^a$ and $9^b$. As may be seen in Fig. 4 the apertures in the radius bars are considerably larger than the axle, and the axle is provided with a ball shaped part 17 fitting the said aperture. The radius bars are also both provided with ring-shaped members 18 and 19 upon opposite sides thereof having flanges 20 providing a seat for the ball, of sufficient width to prevent relative displacement of the radius bar and the balls and still allowing a rotary movement of the ball relative to the radius bar. The ball joint on the jack-shaft is of similar construction. By this arrangement when one of the wheels is raised from the road bed by an obstruction, or otherwise, and the angle of the axle to the horizontal is changed, the ball may turn in the radius rod without twisting the said rod, thus allowing great freedom of movement without material strain being imposed on the connected parts.

If either of the wheels be raised in a true vertical plane, the distance between the ends of the radius rods is increased and, as the two parts of the axle are held in the radius rods, the said members will draw apart and as the wheel is returned again to normal, the spring 12 will draw the said parts together.

The frame or body 1 is provided with a bracket 30, pivotally mounted on the rear end thereof carrying a spring member 31, the opposite ends of which extend over and bear on the radius bars 15 and 16. Stirrups 32 are provided on each radius bar beneath which the ends of the spring extend. By this arrangement and the ball-joint connection with the axle, and the jack-shaft, either of the radius bars may move vertically or horizontally without affecting the other.

From the foregoing description it becomes evident that the axle described is very inexpensive in construction having but few parts requiring but little fine machine work. Each of the wheels being independently driven, the support of the wheels and axles by the radius rods and the spring suspension of the frame thereon allows practically independent movement of each wheel, and a change in the angle of the axle to the horizontal by reason of encountering obstructions in the road surface does not result in particular strain to the unobstructed wheel or twist of the adjacent radius bar.

Having thus briefly described my invention, its utility and general mode of construction, what I claim and desire to secure by Letters Patent of the United States is—

1. In an automobile, a framework, a jack-shaft supported thereby, a rear axle of two parts yieldably held from relative longitudinal movement, wheels mounted on the axle, means for driving the wheels from the jack-shaft, radius rods pivoted on both the jack-shaft and axle near the ends thereof, and a spring interposed between the frame and the radius rods providing the sole means of support of the frame relative to the axle.

2. In an automobile, a framework, a jack-shaft supported thereby, a rear axle, wheels mounted for rotation on the axle, means for driving the wheels from the jack-shaft, radius rods having a ball joint connection with both the jack-shaft and axle near the ends thereof respectively, said axle being formed of two parts adapted for relative longitudinal movement, means for yieldably holding the axle parts in normal relation, and a spring interposed between the frame and the radius rods providing the sole means of support of the frame relative to the axle.

3. In an automobile, a framework, a jack-shaft carried thereby, a rear axle, wheels mounted for rotation on the axle, means for driving the wheels from the jack-shaft, radius rods having a ball-joint connection with both the jack-shaft and the axle near the ends thereof on opposite sides of the frame, the axle being formed of two parts adapted for relative longitudinal movement, a coiled spring having an end attached to each of said parts, said spring being under tension when the two parts of the axle are in normal position, and a spring interposed between the frame and the radius rods providing the sole means of support of the frame relative to the axle.

4. In an automobile, a framework, a jack-shaft supported thereby, a rear axle, wheels mounted for rotation on the axle, means for driving the wheels from the jack-shaft, radius rods having a ball-joint connection with both the jack-shaft and axle near the ends thereof, said ball-joints allowing lateral displacement of the radius bars, means limiting the lateral displacement of the bars, said axle being formed of two tubular parts, a coiled spring positioned about contiguous ends of said parts and secured to each part by means of a bolt passing therethrough, said spring being normally under tension, a tube or the like in telescopic relation with said ends situated between the said bolts for holding the parts of the axle in axial alinement, and a leaf-spring pivotally mounted on the frame and bearing on the radius rods.

5. In an automobile, a framework, a jack-shaft supported thereby, a rear axle of two parts yieldably held from relative longitudinal movement, wheels mounted for rotation on the axle, means for driving the wheels by the jack-shaft, radius rods connecting with both the jack-shaft and axle near the ends thereof respectively, means for yieldably holding the axle parts in normal relation, and a leaf spring centrally pivoted to the framework with the ends thereof slidably engaging each radius rod respectively providing the sole means of support of the frame relative to the axle.

In testimony whereof, I sign this specification in the presence of two witnesses.

OLIVER A. LIGHT.

Witnesses:
RICHARD ALSPAS,
CHARLES E. WISNER.